US009692241B2

(12) United States Patent
Kim et al.

(10) Patent No.: US 9,692,241 B2
(45) Date of Patent: Jun. 27, 2017

(54) METHOD FOR IMPROVING CALL QUALITY DURING BATTERY CHARGING AND ELECTRONIC DEVICE THEREOF

(71) Applicant: Samsung Electronics Co., Ltd., Suwon-si, Gyeonggi-do (KR)

(72) Inventors: Seung-Hun Kim, Gumi-si (KR); Ji-Woong Oh, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 13 days.

(21) Appl. No.: 14/605,069

(22) Filed: Jan. 26, 2015

(65) Prior Publication Data

US 2015/0214769 A1 Jul. 30, 2015

(30) Foreign Application Priority Data

Jan. 28, 2014 (KR) ........................ 10-2014-0010921

(51) Int. Cl.

*H02J 7/00* (2006.01)
*H04M 3/22* (2006.01)
*H04W 52/02* (2009.01)

(52) U.S. Cl.

CPC ......... *H02J 7/0063* (2013.01); *H04M 3/2227* (2013.01); *H04W 52/0277* (2013.01); *H04W 52/0296* (2013.01); *H02J 2007/0067* (2013.01)

(58) Field of Classification Search

CPC .................................................... H02J 7/0063
USPC .................................. 455/343.1, 343.3, 573
See application file for complete search history.

(56) References Cited

U.S. PATENT DOCUMENTS 5,036,532 A * 7/1991 Metroka ........... H04W 52/0296 455/127.1
5,481,593 A * 1/1996 Nakayama ........ H04M 1/72519 455/573
2011/0134014 A1* 6/2011 Kondo .................. H01Q 1/243 343/876
2014/0176046 A1* 6/2014 Park ...................... H02J 7/0024 320/103
2015/0256007 A1* 9/2015 Zadesky ............... H02J 7/0027 320/107

FOREIGN PATENT DOCUMENTS

JP 2004247995 A * 9/2004
JP 2008-131812 A 6/2008
KR 2001-0075737 A 8/2001
KR 20050023921 A * 3/2005

* cited by examiner

*Primary Examiner* — Thomas Lett
(74) *Attorney, Agent, or Firm* — Jefferson IP Law, LLP

(57) ABSTRACT

A method of operating an electronic device is provided. The method includes determining whether a specific event has occurred, when the specific event has occurred, determining whether a battery level is less than a set level, and when the battery level is less than the set level, changing a path of an electric current introduced from a power supply from a first path to a second path.

14 Claims, 8 Drawing Sheets

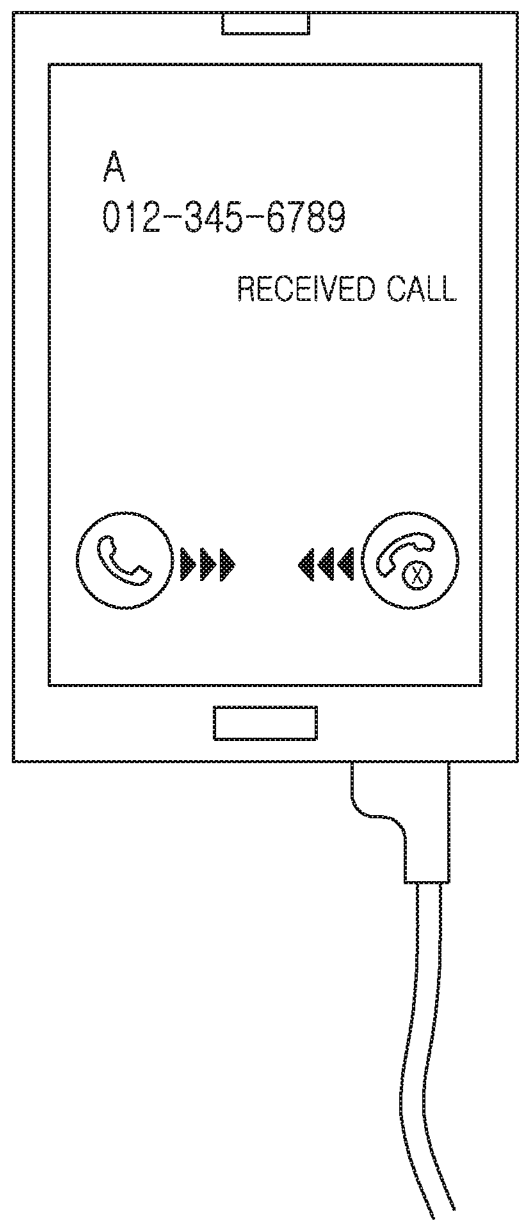
FIG.4
(REPLACEMENT SHEET )

METHOD FOR IMPROVING CALL QUALITY DURING BATTERY CHARGING AND ELECTRONIC DEVICE THEREOF

CROSS-REFERENCE TO RELATED APPLICATION(S)

This application claims the benefit under 35 U.S.C. §119 (a) of a Korean patent application filed on Jan. 28, 2014 in the Korean Intellectual Property Office and assigned Serial number 10-2014-0010921, the entire disclosure of which is hereby incorporated by reference.

TECHNICAL FIELD

The present disclosure relates to a method for improving a call quality during battery charging and an electronic device thereof.

BACKGROUND

With the growth of Information Telecommunication (IT) technologies and semiconductor technologies, a variety of electronic devices are evolving into multimedia devices providing various multimedia services. For example, the electronic devices may provide multimedia services such as a voice telephony service, a video telephony service, a messenger service, a broadcasting service, a wireless Internet service, a camera service, and a music playback service.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for, when a telephony event takes place during battery charging, cutting off an electric current introduced into a battery and applying a charging electric current only to an internal circuit of an electronic device, thereby improving a call quality during battery charging and improving user satisfaction.

Another aspect of the present disclosure is to provide an apparatus and method for, when a telephony event takes place during battery charging, switching a charging path, thereby reducing a noise caused by a charging electric current although a phone call is made during the battery charging, and improving user convenience because no battery is discharged during a telephone conversation.

In accordance with an aspect of the present disclosure, a method of an electronic device is provided. The method includes determining whether a specific event has occurred, when the specific event has occurred, determining a battery level is less than a set level, and when the battery level is less than the set level, changing a path of an electric current introduced from a power supply, from a first path to a second path.

In accordance with another aspect of the present disclosure, an electronic device is provided. The electronic device includes central processing device configured to determine whether a specific event has occurred and, when the specific event has occurred, to determine whether a battery level is less than a set level, and a control unit configured to change, when the battery level is less than the set level, a path of an electric current introduced from a power supply from a first path to a second path.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a diagram illustrating one embodiment of determining whether a specific event has occurred during battery charging in an electronic device according to an embodiment of the present disclosure;

Throughout the drawings, it should be noted that like reference numbers are used to depict the same or similar elements, features, and structures.

DETAILED DESCRIPTION

Figure 1:
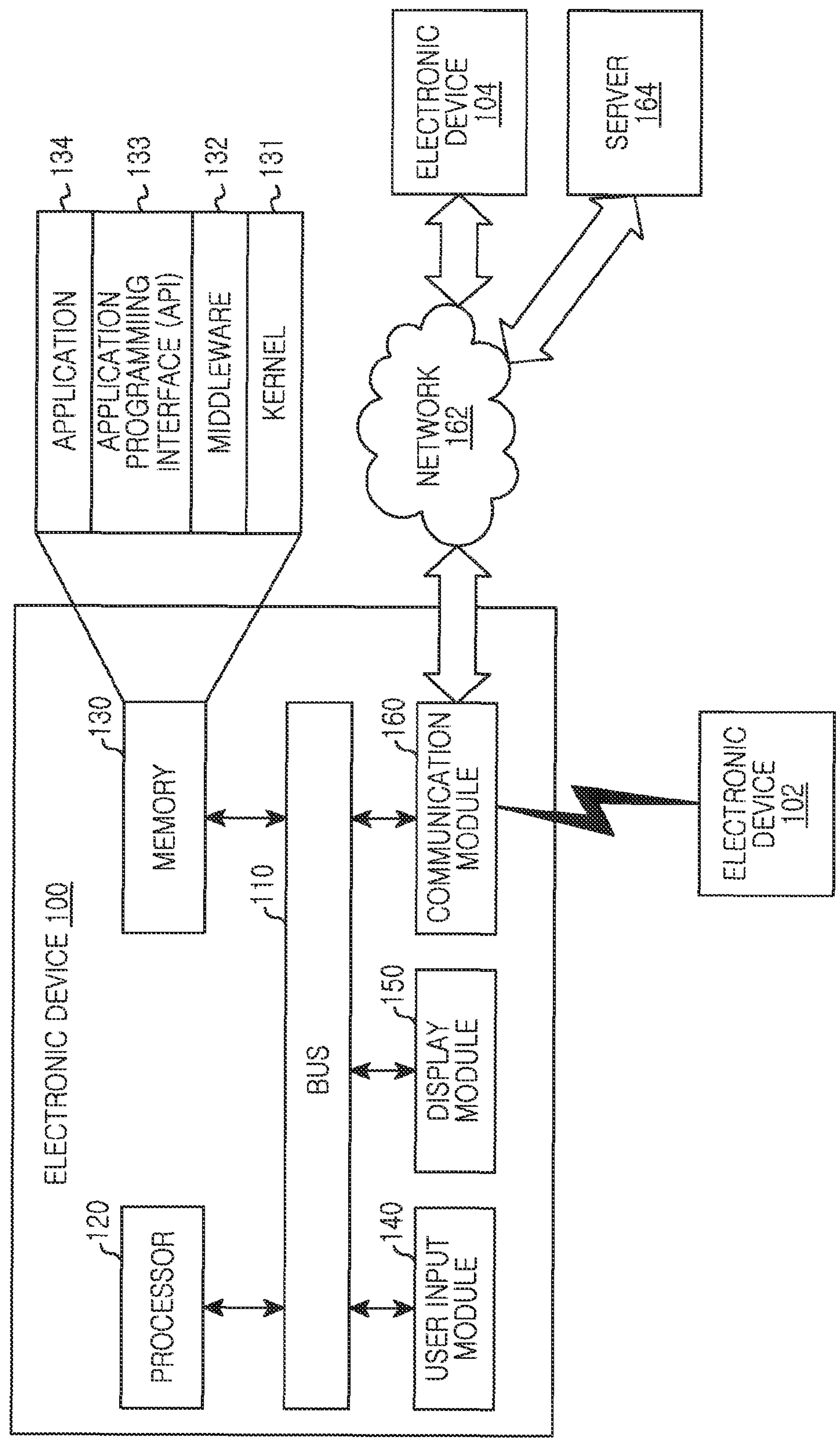
FIG. 1 is a block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to the present disclosure may be a device including a telecommunication function. For example, the electronic device may be one or a combination of two or more of various electronic devices such as a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MPEG Audio Layer 3 (MP3) player, a mobile medical instrument, an electronic bracelet, an electronic necklace, an appcessory, a camera, a wearable device, an electronic clock, a wrist watch, a smart home appliance (e.g., a refrigerator, an air conditioner, a cleaner, an artificial intelligence robot, a television (TV), a Digital Video Disk (DVD) player, an audio system, an oven, a microwave, a washing machine, an air cleaner, an electronic frame, and the like), various medical instruments (e.g., Magnetic Resonance Angiography (MRA), Magnetic Resonance Imaging (MRI), Computerized Tomography (CT), a moving-camera, an ultrasonic machine and the like), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a car infotainment device, an electronic equipment for ships (e.g., a navigation device, a gyrocompass and the like), avionics, a security instrument, electronic clothes, an electronic locking system, a camcorder, a game console, a Head-Mounted Display (HMD), a flat panel display device, an electronic album, part of a furniture or building/structure including a telecommunication function, an electronic board, an electronic signature receiving device, a projector, or the like.

FIG. 1 is a block diagram illustrating a construction of an electronic device according to an embodiment of the present disclosure.

Referring to FIG. 1, the electronic device 100 may include a bus 110, a processor 120, a memory 130, a user input module 140, a display module 150, or a communication module 160.

The bus 110 may be a circuit coupling the aforementioned constituent elements with one another, and forwarding communication (e.g., control message) between the elements of the electronic device 100.

The processor 120 may, for example, receive instructions from the other elements (e.g., the memory 130, the user input module 140, the display module 150, the communication module 160, and the like) through the bus 110, decipher the received instructions, and execute operation or data processing according to the deciphered instructions.

The memory 130 may store an instruction or data which is received from the processor 120 or the other elements (e.g., the user input module 140, the display module 150, the communication module 160, and the like) or is generated by the processor 120 or the other elements. The memory 130 may include, for example, programming modules such as a kernel 131, a middleware 132, an Application Programming Interface (API) 133, applications 134, or the like. The aforementioned programming modules each may be comprised of software, firmware, hardware or a combination thereof.

The kernel 131 may control or manage system resources (e.g., the bus 110, the processor 120, the memory 130, or the like) used for executing operations or functions implemented in the remnant other programming modules, for example, the middleware 132, the API 133, or the applications 134. The kernel 131 may also provide an interface of enabling the middleware 132, the API 133, or the applications 134 to connect and control or manage the individual constituent element of the electronic device 100.

The middleware 132 may perform a relay role of enabling the API 133 or the applications 134 to communicate and exchange data with the kernel 131. In relation with work requests received from the (plurality of) applications 134, the middleware 132 may, for example, perform load balancing for the work request using a method of allotting at least one application among the (plurality of) applications 134 priority order capable of using the system resources (e.g., the bus 110, the processor 120, the memory 130 or the like) of the electronic device 100 and the like.

The API 133 is an interface of enabling the applications 134 to control a function provided by the kernel 131 or the middleware 132. The API 133 may include, for example, at least one interface or function for file control, window control, image processing, character control, or the like.

The user input module 140 may, for example, receive an input of an instruction or data from a user and forward the instruction or data to the processor 120 or the memory 130 through the bus 110. The display module 150 may display an image, a video, data, or the like to the user.

The communication module 160 may establish communication between the electronic device 100 and another electronic device 102. The communication module 160 may also communicate with an electronic device 104 or a server 164 via a network 162. The communication module 160 may support a certain short-range communication protocol (e.g., WiFi, Bluetooth (BT), or Near Field Communication (NFC)) or a certain network communication 162 (e.g., the Internet, a Local Area Network (LAN), a Wide Area Network (WAN), a telecommunication network, a cellular network, a satellite network, a Plain Old Telephone System (POTS) or the like). The electronic devices 102 and 104 each may be the same (e.g., same-type) device as the electronic device 100 or may be a different (e.g., different-type) device.

Figure 2:
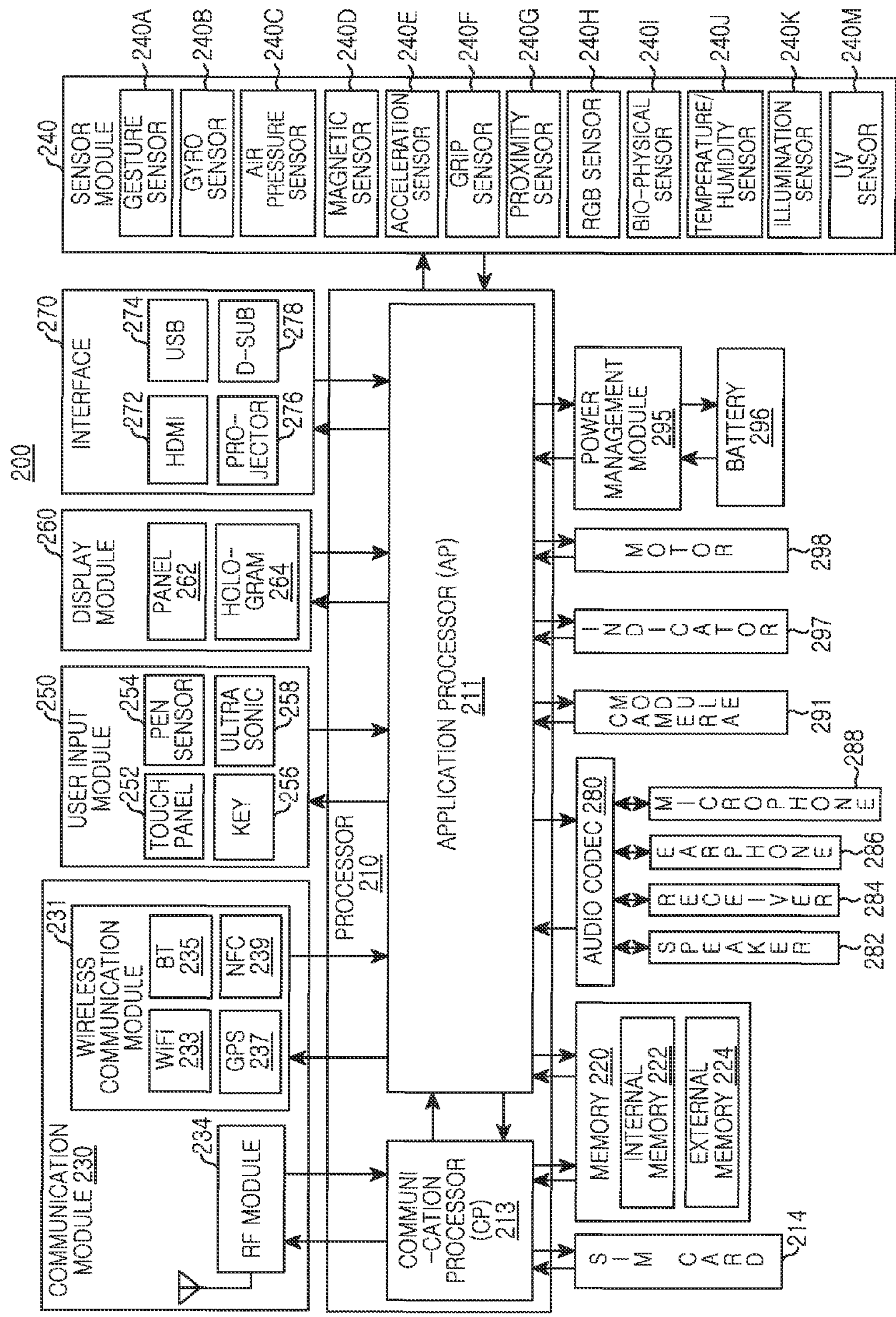
FIG. 2 is a block diagram illustrating hardware according to an embodiment of the present disclosure.

FIG. 2 is a block diagram illustrating a construction of hardware according to an embodiment of the present disclosure. The hardware 200 may be, for example, the electronic device 100 illustrated in FIG. 1.

Referring to FIG. 2, the hardware 200 includes one or more processors 210, a Subscriber Identification Module (SIM) card 214, a memory 220, a communication module 230, a sensor module 240, a user input module 250, a display module 260, an interface 270, an audio codec 280, a camera module 291, a power management module 295, a battery 296, an indicator 297, and a motor 298.

The processor 210 (e.g., the processor 120) may include one or more Application Processors (APs) 211 and one or more Communication Processors (CPs) 213. The processor 210 may be, for example, the processor 120 illustrated in FIG. 1. FIG. 2 illustrates that the AP 211 and the CP 213 are included within the processor 210, but the AP 211 and the CP 213 may be included within different IC packages, respectively. In one embodiment, the AP 211 and the CP 213 may be included within one IC package.

The AP 211 may drive an operating system or an application program and control a plurality of hardware or software constituent elements coupled to the AP 211, and perform processing and operations of various data including multimedia data. The AP 211 may be, for example, implemented as a System on Chip (SoC). According to an embodiment of the present disclosure, the processor 210 may further include a Graphic Processing Unit (GPU) (not shown). The AP 211 may determine if a set event has occurred and, when the set event has occurred, the AP 211 may determine whether a battery level is less than a set level. The AP 211 may determine whether an electric current introduced from a power supply is applied to the electronic device 100. The AP 211 may determine whether a power source is being supplied from a battery, may determine whether the set event has been ended, and may determine whether the power supply has been coupled with the electronic device 100.

The CP 213 may perform a function of managing a data link and converting a communication protocol in a communication between an electronic device (e.g., the electronic device 100) including the hardware 200 and another electronic device 104 coupled through a network 162. The CP 213 may be implemented as a SoC. According to an embodiment of the present disclosure, the CP 213 may perform at least part of a multimedia control function. The CP 213 may perform terminal distinction and authentication within a communication network, using a subscriber identity module (e.g., the SIM card 214). The CP 213 may provide services such as voice telephony, video telephony, a text message, packet data or the like to a user.

The CP 213 may control data transmission/reception of the communication module 230. FIG. 2 illustrates the elements such as the CP 213, the power management module 295, the memory 220 or the like as elements separate from the AP 211 but, according to an embodiment of the present disclosure, the AP 211 may be implemented to include at least some (e.g., the CP 213) of the aforementioned constituent elements.

According to an embodiment, the AP 211 or the CP 213 may load, to a volatile memory, an instruction or data received from a non-volatile memory coupled to each of the AP 211 and the CP 213 or at least one other element, and process the loaded instruction or data. The AP 211 or the CP 213 may store in the non-volatile memory data received from at least one of the other constituent elements or generated by at least one of the other elements.

The SIM card 214 may be a card implementing the subscriber identity module, and may be inserted into a slot provided in a specific location of the electronic device 100. The SIM card 214 may include unique identification information (e.g., Integrated Circuit Card ID (ICCID)) or subscriber information (e.g., International Mobile Subscriber Identity (IMSI)).

The memory 220 may include an internal memory 222 or an external memory 224. The memory 220 may be, for example, the memory 130 illustrated in FIG. 1. The internal memory 222 may include, for example, at least one of a volatile memory (e.g., a Dynamic Random Access Memory (DRAM), a Static Random Access Memory (SRAM), a Synchronous Dynamic Random Access Memory (SDRAM) and the like) or a non-volatile memory (e.g., a One Time PROM (OTPROM), a Programmable ROM (PROM), an Erasable Programmable ROM (EPROM), an Electrically Erasable Programmable ROM (EEPROM), a mask Read Only Memory (ROM), a flash ROM, a Not AND (NAND) flash memory, a Not OR (NOR) flash memory and the like). The internal memory 222 may take a form of Solid State Drive (SSD). The external memory 224 may further include, for example, Compact Flash (CF), Secure Digital (SD), Micro Secure Digital (Micro-SD), Mini Secure Digital (Mini-SD), extreme Digital (xD), a memory stick or the like.

The communication module 230 may include a wireless communication module 231 or a Radio Frequency (RF) module 234. The communication module 230 may be, for example, the communication module 160 illustrated in FIG. 1. The wireless communication module 231 may include, for example, WiFi 233, BT 235, GPS 237 or NFC 239. The wireless communication module 231 may provide a wireless communication function using radio frequency. Additionally or alternatively, the wireless communication module 231 may include a network interface (e.g., a LAN card) for coupling the hardware 200 with a network (e.g., the Internet, a LAN, a WAN, a telecommunication network, a cellular network, a satellite network, a POTS, or the like), a modem or the like.

The RF module 234 may take charge of transmission/reception of data, for example, transmission/reception of an RF signal or a called electric signal. The RF module 234 may include, though not illustrated, for example, a transceiver, a Power Amp Module (PAM), a frequency filter, a Low Noise Amplifier (LNA) or the like. The RF module 234 may further include a component for transmitting/receiving an electromagnetic wave on a free space in a wireless communication, for example, a conductor, a conducting wire or the like.

The sensor module 240 may include, for example, at least one of a gesture sensor 240A, a gyro sensor 240B, an air pressure sensor 240C, a magnetic sensor 240D, an acceleration sensor 240E, a grip sensor 240F, a proximity sensor 240G, a Red Green Blue (RGB) sensor 240H, a bio-physical sensor 240I, a temperature/humidity sensor 240J, an illumination sensor 240K, or a Ultraviolet (UV) sensor 240M. The sensor module 240 may measure a physical quantity or sense an activation state of the electronic device 100 and convert the measured or sensed information into an electrical signal. Additionally or alternatively, the sensor module 240 may include, for example, an Electronic nose (E-nose) sensor (not shown), an Electromyography (EMG) sensor (not shown), an Electroencephalogram (EEG) sensor (not shown), an Electrocardiogram (ECG) sensor (not shown), a fingerprint sensor (not shown) or the like. The sensor module 240 may further include a control circuit for controlling at least one or more sensors provided therein.

The user input module 250 may include a touch panel 252, a (digital) pen sensor 254, a key 256, or an ultrasonic input device 258. The user input module 250 may be, for example, the user input module 140 illustrated in FIG. 1. The touch panel 252 may recognize, for example, a touch input in at least one method among a capacitive method, a pressure sensitive method, an infrared method, and an ultrasonic method. The touch panel 252 may also further include a controller (not shown). In the capacitive method, proximity recognition as well as direct touch is possible. The touch panel 252 may also further include a tactile layer. In this case, the touch panel 252 may provide a tactile response to a user.

The (digital) pen sensor 254 may be implemented, for example, using a method being the same or similar to a method of receiving a user's touch input or a separate recognizing sheet. The key 256 may be, for example, a keypad or a touch key. The ultrasonic input device 258 is a device capable of checking data by sensing a sound wave with a microphone (e.g., a microphone 288) of the electronic device through a pen generating an ultrasonic signal, and may perform wireless recognition. The hardware 200 may also receive a user input from an external device (e.g., a network, a computer, or a server) coupled to the hardware 200 using the communication module 230.

The display module 260 may include a panel 262 or a hologram 264. The display module 260 may be, for example, the display module 150 illustrated in FIG. 1. The panel 262 may be, for example, a Liquid Crystal Display (LCD), an Active-Matrix Organic Light-Emitting Diode (AMOLED), or the like. The panel 262 may be implemented to be flexible, transparent, or wearable, for example. The panel 262 may be also constructed as one module together with the touch panel 252. The hologram 264 may show a three-dimensional image in the air by using interference of light. The display module 260 may further include a control circuit for controlling the panel 262 or the hologram 264.

The interface 270 may include, for example, a High-Definition Multimedia Interface (HDMI) 272, a Universal Serial Bus (USB) 274, a projector 276, or a D-subminiature (D-sub) 278. Additionally or alternatively, the interface 270 may include, for example, Secure Digital/Multi Media Card (SD/MMC) (not shown) or Infrared Data Association (IrDA) (not shown).

The audio codec 280 may convert a voice and an electric signal interactively. The audio codec 280 may convert, for example, voice information that is inputted or outputted through a speaker 282, a receiver 284, an earphone 286, the microphone 288, or the like.

The camera module 291 is a device capable of taking a picture and a video. The camera module 291 may include one or more image sensors (e.g., front lenses or rear lenses), an Image Signal Processor (ISP) (not shown), or a flash LED (not shown).

The power management module 295 may manage electric power of the hardware 200. Though not illustrated, the power management module 295 may include, for example, a Power Management Integrated Circuit (PMIC), a charger Integrated Circuit (IC), or a battery gauge.

The PMIC may be mounted, for example, within an integrated circuit or a SoC semiconductor. A charging method may be divided into a wired charging method and a wireless charging method. The charger IC may charge a battery, and may prevent the inflow of overvoltage or over current from an electric charger. The charger IC may include a charger IC for at least one of the wired charging method or the wireless charging method. Wireless charging methods include a magnetic resonance method, a magnetic induction method, an electromagnetic wave method, or the like. Supplementary circuits for wireless charging, for example, circuits such as a coil loop, a resonance circuit, a rectifier and the like may be added.

The battery gauge may measure, for example, a level of the battery 296, a charging voltage thereof, a charging electric current thereof, or a charging temperature thereof. The battery 296 may generate electricity and supply a power source. The battery 296 may be, for example, a rechargeable battery.

The indicator 297 may indicate a specific state of the hardware 200 or a part (e.g., the AP 211) thereof, for example, a booting state, a message state, a charging state or the like. The motor 298 may convert an electrical signal into a mechanical vibration.

Though not illustrated, the hardware 200 may include a processing device (e.g., a GPU) for mobile TV support. The processing device for mobile TV support may process, for example, standard media data of Digital Multimedia Broadcasting (DMB), Digital Video Broadcasting (DVB), a media flow or the like.

The names of the aforementioned elements of the hardware 200 according to the present disclosure may be different depending on the kind of the hardware 200. The hardware 200 according to an exemplary embodiment of the present disclosure may include at least one of the aforementioned elements, and may omit some elements or further include additional elements. Some of the elements of the hardware 200 may be combined and constructed as one entity, thereby being able to identically perform the functions of the corresponding constituent elements before combination.

Figure 3:
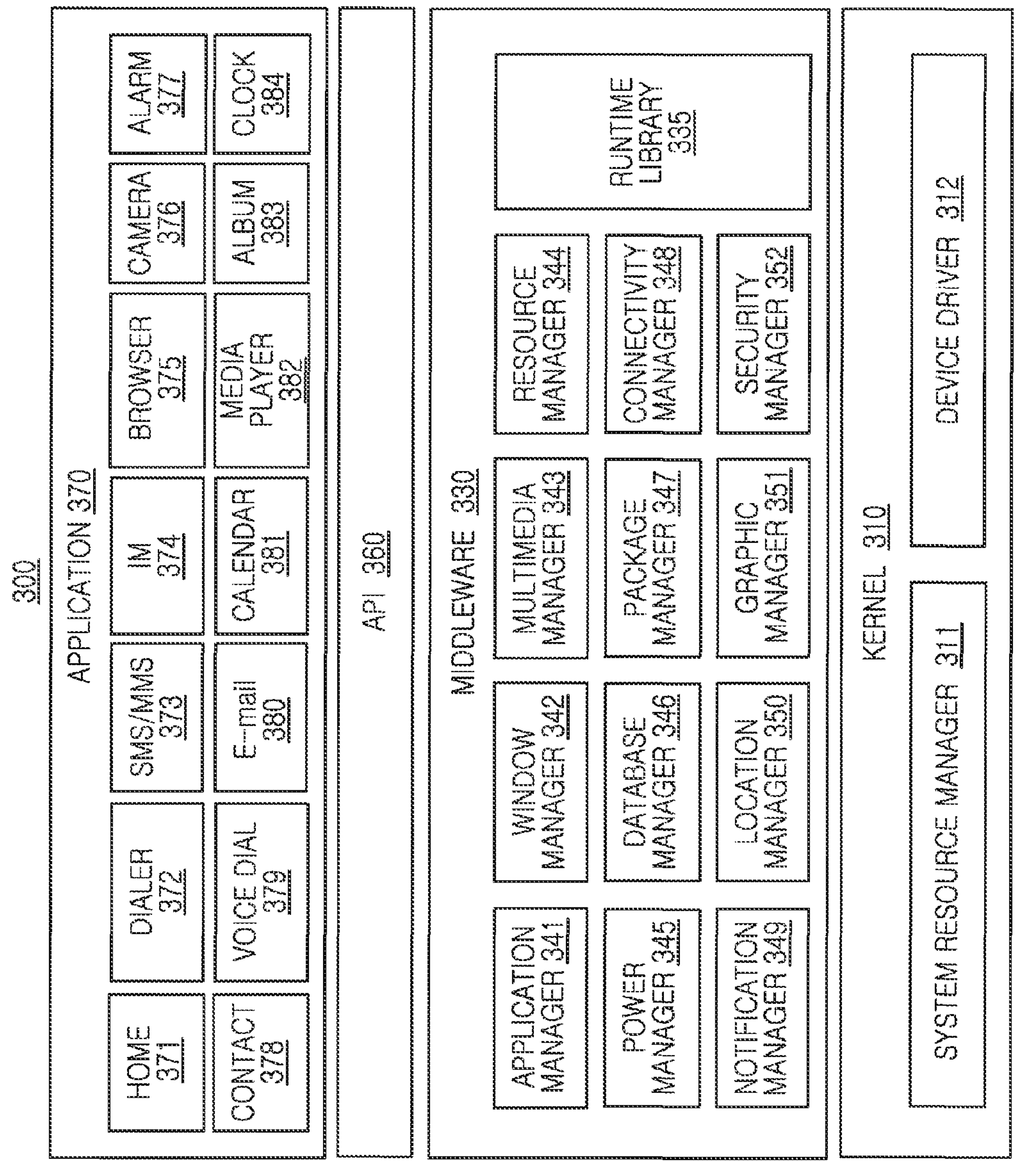
FIG. 3 is a block diagram illustrating a programming module according to an embodiment of the present disclosure.

FIG. 3 is a block diagram illustrating a construction of a programming module according to an embodiment of the present disclosure.

The programming module 300 may be included (e.g., stored) in the electronic device 100 (e.g., the memory 130) illustrated in FIG. 1. At least part of the programming module 300 may be comprised of software, firmware, hardware, or a combination thereof. The programming module 300 may include an Operating System (OS) which is implemented in hardware (e.g., the hardware 200) and controls resources related to the electronic device (e.g., the electronic device 100), or various applications (e.g., the application 370) which are run in the operating system. For example, the operating system may be Android, iPhone OS (iOS), Windows, Symbian, Tizen, Bada, or the like. Referring to FIG. 3, the programming module 300 may include a kernel 310, a middleware 330, an API 360, or an application 370.

The kernel 310 (e.g., the kernel 131) may include a system resource manager 311 or a device driver 312. The system resource manager 311 may include, for example, a process management unit, a memory management unit, a file system management unit, or the like. The system resource manager 311 may perform control of a system resource, allocation thereof, recovery thereof, or the like. The device driver 312 may include, for example, a display driver, a camera driver, a Bluetooth driver, a shared memory driver, a USB driver, a keypad driver, a WiFi driver, or an audio driver. Also, according to one embodiment, the device driver 312 may include an Inter-Process Communication (IPC) driver (not shown).

The middleware 330 may include a plurality of modules previously implemented to provide functions commonly required by the applications 370. The middleware 330 may provide the functions to the applications 370 through the API 360 such that the applications 370 may make efficient use of restricted system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that is used by a compiler to add a new function through a programming language while the application 370 is run. According to one embodiment, the runtime library 335 may perform a function of input/output, memory management, arithmetic function or the like.

The application manager 341 may manage, for example, a life cycle of at least one application among the applications 370. The window manager 342 may manage a GUI resource used in a screen. The multimedia manager 343 may grasp a format necessary for playback of various media files, and perform encoding or decoding of the media file using a codec adapted to the corresponding format. The resource manager 344 may manage a resource such as a source code of at least any one application among the applications 370, a memory thereof, a storage space thereof, or the like.

The power manager 345 may operate together with a Basic Input/Output System (BIOS) and the like and manage a battery or power source, and provide electric power information and the like necessary for the operation. The database manager 346 may create, search or change a database that will be used in at least one application among the applications 370. The package manager 347 may manage installation or updating of an application which is distributed in a form of a package file.

The connectivity manager 348 may manage, for example, wireless connectivity such as WiFi, Bluetooth or the like. The notification manager 349 may display or notify an event such as an arrival message, an appointment, a proximity notification and the like in a way not disturbing a user. The location manager 350 may manage location information of the electronic device. The graphic manager 351 may manage a graphic effect to be provided to the user or a user interface related to this. The security manager 352 may provide a general security function necessary for system security, user authentication, or the like. If the electronic device (e.g., the electronic device 100) has a phone function, the middleware 330 may further include a telephony manager (not shown) for managing a voice or video telephony function of the electronic device.

The middleware 330 may create and use a new middleware module through a combination of various functions of the aforementioned internal constituent element modules. The middleware 330 may provide a module that is specialized by kind of the operating system to provide a differentiated function. The middleware 330 may dynamically delete some of the existing elements or add new elements. Accordingly, the middleware 330 may omit some of the elements or further include other elements or substitute other elements with elements of different names performing similar functions.

The API 360 (e.g., the API 133), a set of API programming functions, may be provided to have a different construction in accordance to the operating system. For example, in a case of Android or iOS, the API 360 may, for example, provide one API set by platform and, in a case of Tizen, it may, for example, provide two or more API sets by platform.

The applications 370 (e.g., the applications 134) may include, for example, a preloaded application or a third party application. The applications 370 may include a home screen application 371, a dialer 372, an SMS/MMS application 373, an IM application 374, a web browser 375, a camera application 376, an alarm application 377, a contact manager application 378, a voice dial application 379, an E-mail application 380, a calendar application 381, a media player 382, an album application 383, and a clock application 384.

At least part of the programming module 300 may be implemented by an instruction stored in a computer-readable storage media. When the instruction is executed by one or more processors (e.g., the processor 210), the one or more processors may perform a function corresponding to the instruction. The computer-readable storage media may be, for example, the memory 260. At least part of the programming module 300 may be, for example, implemented (e.g., executed) by the processor 210. At least part of the programming module 300 may include, for example, a module, a program, a routine, an instruction set, a process or the like for performing one or more functions.

The names of the elements of the programming module (e.g., the programming module 300) may be different depending on the kind of the operating system. The programming module may also include at least one or more of the aforementioned elements, omit some of the aforementioned elements, or further include additional elements.

FIG. 4 is a diagram illustrating one embodiment of determining whether a specific event has occurred during battery charging in an electronic device according to an embodiment of the present disclosure.

Referring to FIG. 4, first, the electronic device may determine whether a power supply (e.g., a Travel Adaptor) has been coupled. The electronic device may determine whether the electronic device is receiving a supply of a power source from the power supply in order to charge a battery included in the electronic device. The electronic device may control to allow an electric current applied from the power supply to flow along a set 1$^{st}$ path. The electronic device may apply the electric current applied from the power supply to a path passing a control unit (e.g., a charger IC), the battery, and a central processing device (e.g., an application processor). The electronic device may charge the battery with the power source applied from the power supply and concurrently, receive a supply of a power source from the battery.

The electronic device may determine whether a specific event has occurred. The specific event may be an event of determining that a telephone conversation with another electronic device has begun. A set event may be an event of determining that the electronic device receives a call request from another electronic device or sends a call request to another electronic device, thereby beginning the telephone conversation with another electronic device.

For example, as illustrated in FIG. 4, while receiving the supply of the power source from the power supply, when receiving a call request from another electronic device having a phone number "012-345-6789", the electronic device may determine that the specific event has occurred.

When detecting the specific event, the electronic device may determine whether a battery level is less than a set level. The electronic device may determine whether a present battery level is equal to or is greater than the set level or is less than the set level. For example, the battery level set in the electronic device may be set as forty percent. In the aforementioned example, while receiving the supply of the power source from the power supply, when detecting the set event of beginning the telephone conversation with another electronic device, the electronic device may determine whether the present battery level is less than the set forty percent.

When the present battery level is less than the set level, the electronic device may change a path of an electric current introduced from the power supply, from the set 1$^{st}$ path to a set 2$^{nd}$ path. The electronic device may apply the electric current applied from the power supply, to the set 2$^{nd}$ path passing the control unit and the central processing device excluding the battery. After detecting the occurrence of the specific event, when the present battery level is less than the set level, the electronic device may cut off an electric current applied to the battery and straightly receive the supply of the power source from the power supply.

Accordingly, even when the battery level is insufficient, the electronic device may receive the supply of the power source from the power supply and perform the telephone conversation with another electronic device. The electronic device may also cut off the flow of the electric current applied to the battery and does not receive the supply of the power source from the battery, thereby providing a solution to a conventional disadvantage of generating a noise due to a charging electric current during the telephone conversation.

Figure 5A:
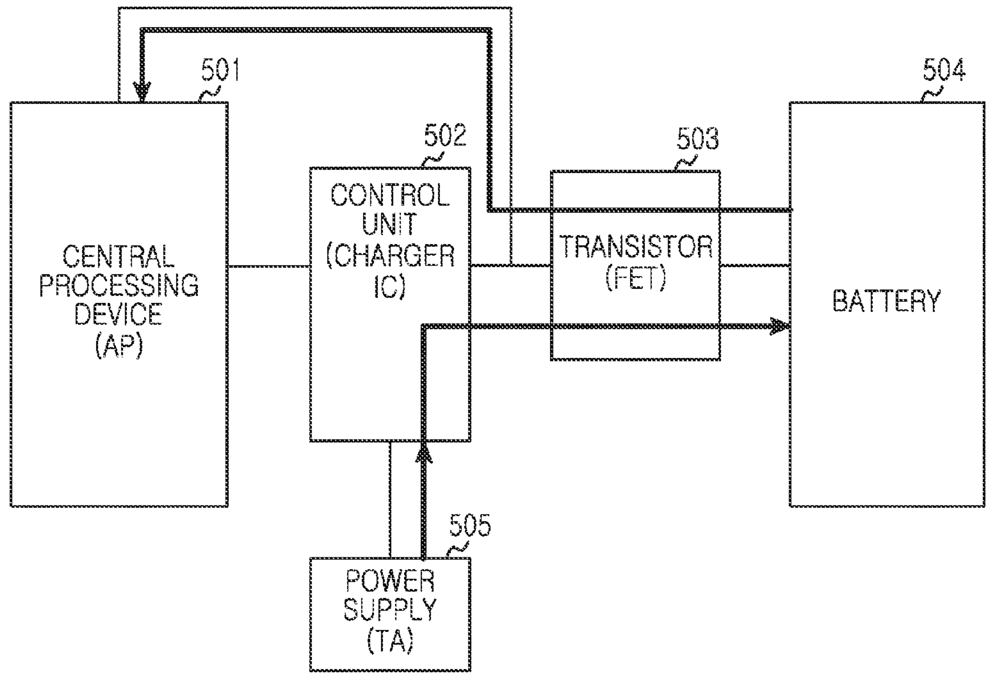
FIGS. 5A and 5B are diagrams illustrating a $1^{st}$ path and a $2^{nd}$ path established when a power source is being applied from a power supply in an electronic device according to an embodiment of the present disclosure.
Figure 5B:
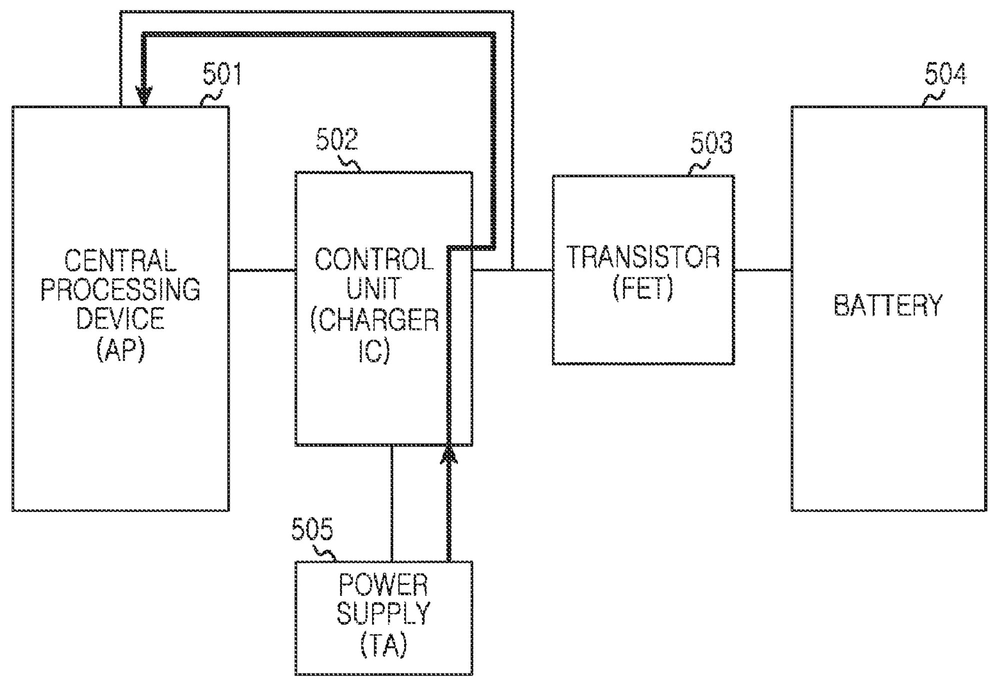

FIGS. 5A and 5B are diagrams illustrating a $1^{st}$ path and a $2^{nd}$ path established when a power source is being applied from a power supply in an electronic device according to an embodiment of the present disclosure.

Referring to FIG. 5A and FIG. 5B, the electronic device may include a central processing device 501, a control unit 502, a transistor 503, and a battery 504.

The electronic device may determine whether a power supply 505 has been coupled to a set region of the electronic device. The electronic device may determine whether the electronic device is receiving a supply of a power source from the power supply 505 to charge the battery 504 included in the electronic device.

To charge the battery 504, the electronic device may control to allow an electric current applied from the power supply 505 to flow along the set $1^{st}$ path. For example, as illustrated in FIG. 5A, the electronic device may control to allow the electric current applied from the power supply 505 to pass the control unit 502, the transistor 503, the battery 504, and the central processing device 501. The electric current applied from the power supply 505 may pass the control unit 502 and the transistor 503 and be applied to the battery 504 to charge the battery 504. The battery 504 may apply the applied electric current to the central processing device 501 to operate the electronic device.

The central processing device 501 may determine whether a specific event has occurred. The specific event may be an event of detecting that a telephone conversation with another electronic device is begun. The specific event may be an event of detecting that the electronic device receives a call request from another electronic device or sends a call request to another electronic device, thereby beginning the telephone conversation with another electronic device.

If the central processing device 501 provided in the electronic device detects the specific event, the electronic device may determine whether a battery level is less than a set level. The central processing device 501 provided in the electronic device may determine whether a present battery level is equal to or greater than the set level or is less than the set level.

If the central processing device 501 determines that the present battery level is less than the set level, the central processing device 501 may transmit to the control unit 502 an cutting off signal for cutting off an electric current applied toward the battery 504.

The control unit 502 may control the transistor 503 playing a switching role to cut off the electric current applied toward the battery 504. The control unit 502 may control the transistor 503 to open a conducting wire between the control unit 502 and the battery 504. The control unit 502 may control the transistor 503 to open the shorted conducting wire between the control unit 502 and the battery 504.

If playing the switching role of opening or shorting the conducting wire under control of the control unit 502, various elements would be possible without regard to names, in place of the transistor 503. For example, the transistor 503 may be all components playing the switching role such as a Bipolar Junction Transistor (BJT), a Field Effect Transistor (FET), an analogue switch and the like.

The electronic device may then determine whether the electric current introduced from the power supply 505 is not applied toward the battery 504. For example, as illustrated in FIG. 5B, the electronic device may determine whether the electric current introduced from the power supply 505 straightly passes the control unit 502 and is applied to the central processing device 501, without being applied toward the battery 504.

Accordingly, the electronic device cuts off the electric current applied toward the battery 504, thereby providing a solution to an issue in which the electric current flowing from the control unit 502 to the battery 504 increases more than the electric current flowing from the battery 504 to the central processing device 501, deteriorating a call quality.

In addition, when detecting a specific event, the electronic device may determine a present level of the battery 504 and, when the level of the battery 504 is equal to or is greater than a set level, the electronic device cuts off a power source that is being applied from the power supply 505. Accordingly, the electronic device provides a solution to an issue in which a telephone conversation is interrupted because the battery level gets insufficient during the telephone conversation and also, provides a solution to an issue in which the charging electric current causes a noise during the telephone conversation.

Figure 6A:
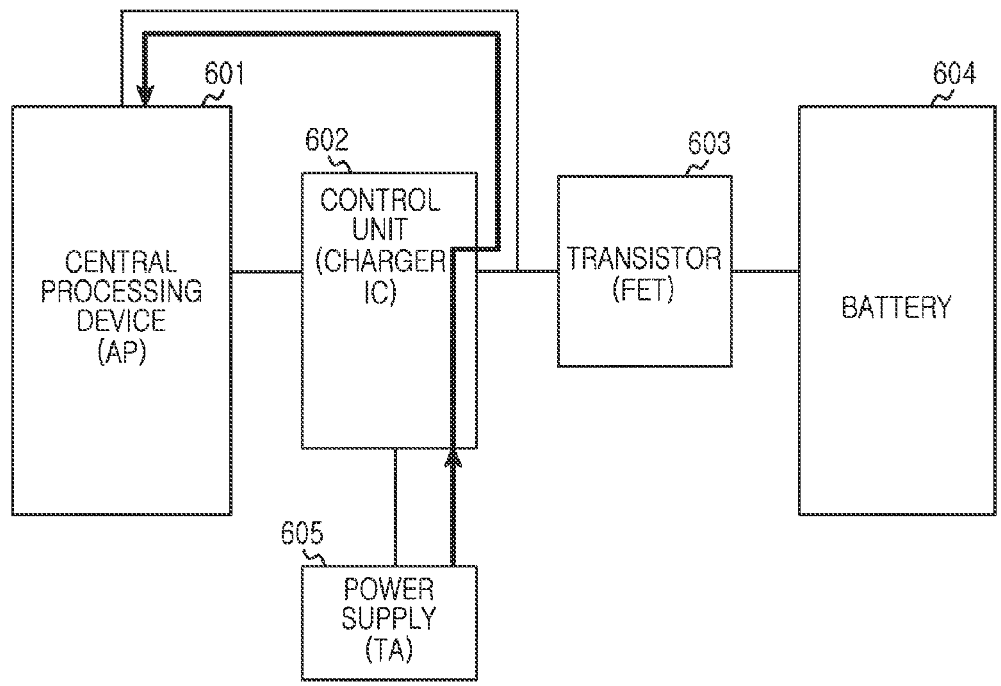
FIGS. 6A and 6B are diagrams illustrating changing a path of an electric current that is being applied from a power supply in an electronic device when a specific event is ended according to an embodiment of the present disclosure.
Figure 6B:
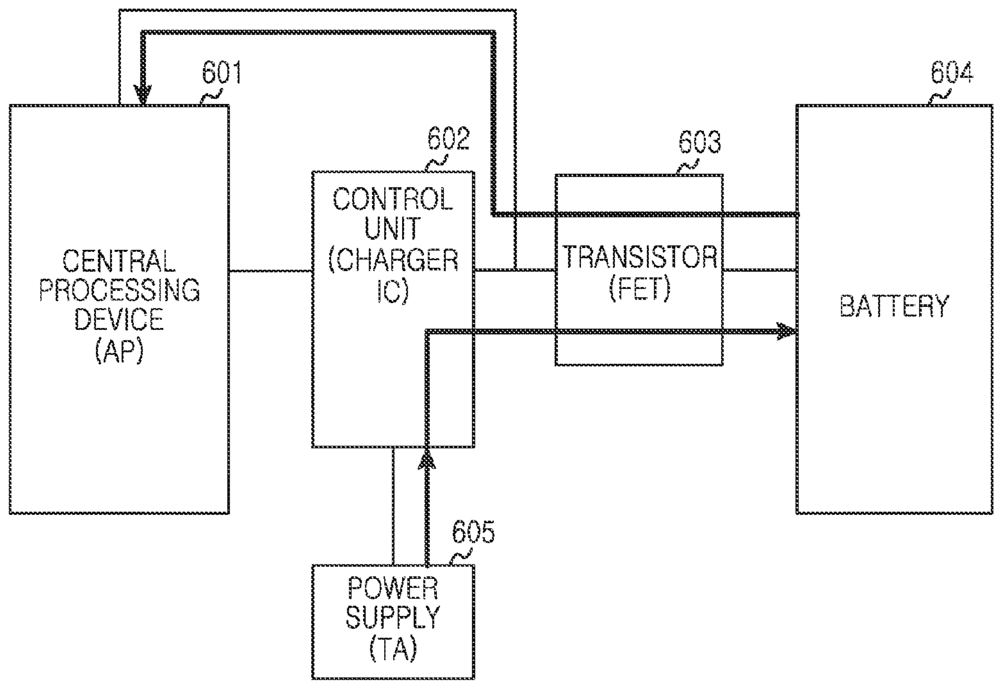

FIGS. 6A and 6B are diagrams illustrating changing a path of an electric current that is being applied from a power supply in an electronic device when a specific event is ended according to an embodiment of the present disclosure.

Referring to FIGS. 6A and 6B, after determining that a specific event has occurred, when determining that a present level of a battery 604 is less than a set level, the electronic device may control to allow an electric current that is being applied from a power supply 605 to flow along a set $2^{nd}$ path.

For example, as illustrated in FIG. 6A, the electronic device may control to allow the electric current introduced from the power supply 605 to pass a control unit 602 and be directly applied to a central processing device 601, without being applied toward the battery 604.

After that, the electronic device may determine whether the specific event has ended. The electronic device may determine whether a telephone conversation with another electronic device has ended. For example, when receiving a call from another electronic device, the electronic device may determine whether the connected call with another electronic device has terminated.

If the electronic device determines that the specific event has ended, the electronic device may control to allow the electric current introduced from the power supply 605 to flow along a set $1^{st}$ path instead of the set $2^{nd}$ path. If the central processing device 601 of the electronic device determines that the specific event has been ended, the central processing device 601 may transmit an open signal to the control unit 602 such that the electric current supplied from the power supply 605 can flow toward the battery 604.

The control unit 602 may control the transistor 603 to apply the electric current toward the battery 604. The control unit 602 may control the transistor 603 to short a conducting wire between the control unit 602 and the battery 604. The control unit 602 may control the transistor 603 to short the opened conducting wire between the control unit 602 and the battery 604.

The electronic device may then determine whether the electric current introduced from the power supply 605 is applied toward the battery 604 and charges the battery 604. For example, as illustrated in FIG. 6B, the electronic device may determine whether the electric current introduced from the power supply 605 passes the control unit 602, the transistor 603, the battery 604, and the central processing device 601.

Figure 7:
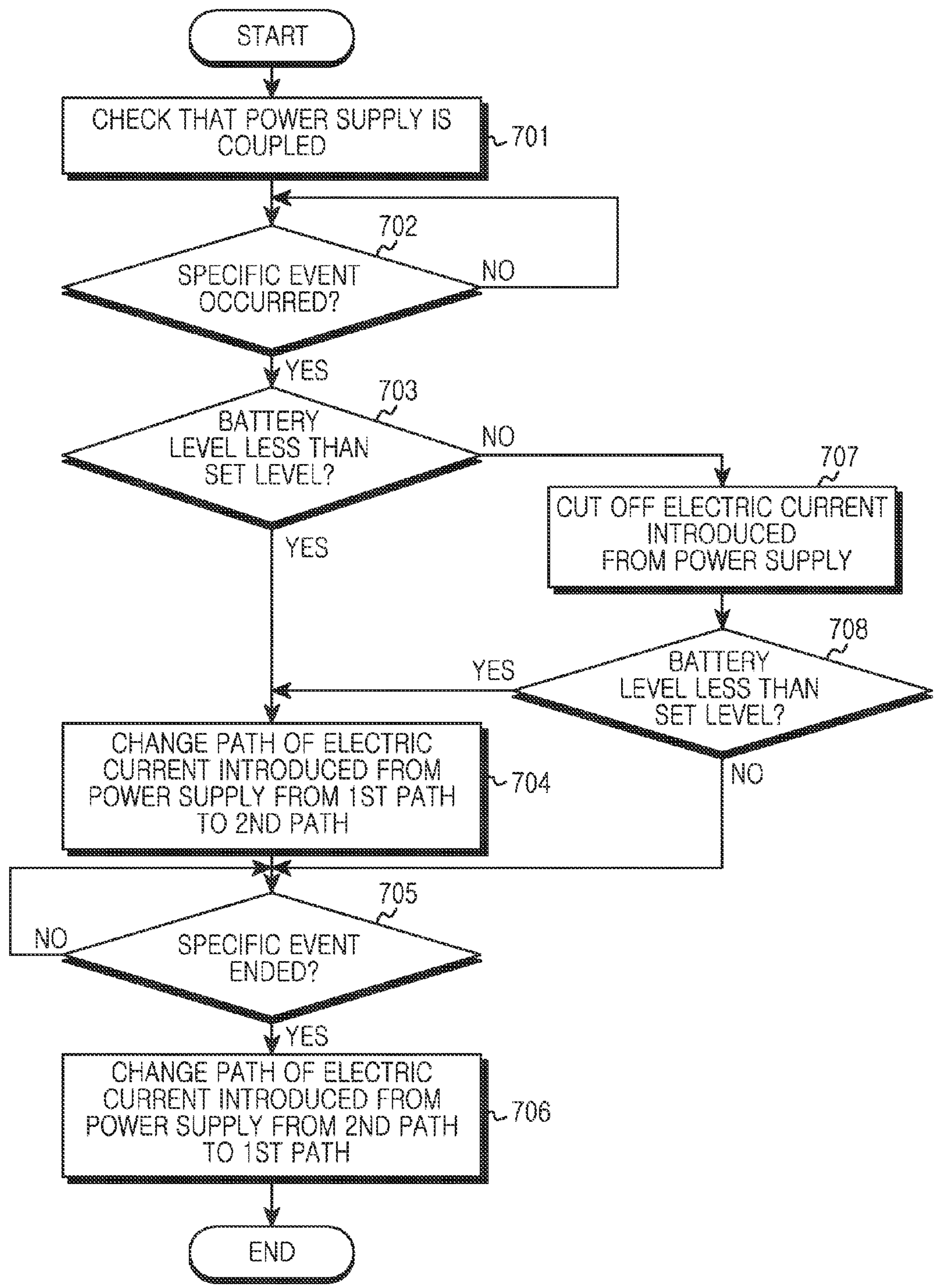
FIG. 7 is a flowchart illustrating a method of operating an electronic device according to an embodiment of the present disclosure.

FIG. 7 is a flowchart illustrating an operation of an electronic device according to an embodiment of the present disclosure.

Referring to FIG. 7, in operation 701, the electronic device may determine whether a power supply is coupled. The electronic device may determine whether the electronic device is receiving a supply of a power source from the power supply to charge a battery provided in the electronic device. The electronic device may simultaneously control to allow an electric current applied from the power supply to pass a control unit, a transistor, the battery and a central processing device. The electric current applied from the power supply may pass the control unit and the transistor and be applied to the battery, thereby being able to charge the battery.

In operation 702, the electronic device may determine whether a set event has occurred. A central processing device provided in the electronic device may determine whether a specific event has occurred. The specific event may be an event of detecting that a telephone conversation with another electronic device is begun. The specific event in the present disclosure may be an event of detecting that the electronic device receives a call request from another electronic device or sends a call request to another electronic device, thereby beginning the telephone conversation with another electronic device.

If the central processing device provided in the electronic device determines that the specific event has occurred in the aforementioned judgment process, then in operation 703, the electronic device may determine whether a battery level is less than a set level. The central processing device provided in the electronic device may determine whether the present battery level is equal to or is greater than the set level or is less than the set level.

If the electronic device determines that the present battery level is less than the set level, then in operation 704, the electronic device may change a path of an electric current introduced from the power supply, from a set $1^{st}$ path to a set $2^{nd}$ path. If the central processing device determines that the present battery level is less than the set level, the central processing device may transmit to the control unit a cutting off signal for cutting off an electric current applied toward the battery. The control unit may control the transistor playing a switching role to cut off the electric current applied toward the battery. The control unit may control the transistor to open a conducting wire between the control unit and the battery. The control unit may control the transistor to open the shorted conducting wire between the control unit and the battery. The electronic device may then determine whether the electric current introduced from the power supply is not applied toward the battery.

In operation 705, the electronic device may determine whether the set event has ended. The electronic device may determine whether the telephone conversation with another electronic device has been ended. For example, when receiving a call from another electronic device, the electronic device may determine whether the connected call with another electronic device has been terminated.

If the electronic device determines that the specific event has ended, then in operation 706, the electronic device may change the path of the electric current introduced from the power supply, from the set $2^{nd}$ path to the set $1^{st}$ path. If the central processing device of the electronic device determines that the specific event has ended, the central processing device may transmit an open signal to the control unit such that the electric current supplied from the power supply can flow toward the battery. The control unit may then control the transistor to apply the electric current toward the battery. The control unit may control the transistor to short a conducting wire between the control unit and the battery. The control unit may control the transistor to short the opened conducting wire between the control unit and the battery. The electronic device can determine that the electric current introduced from the power supply is applied toward the battery and is charging the battery.

In operation 703, if the electronic device determines that the battery level is equal to or is greater than the set level, then in operation 707, the electronic device may cut off the electric current introduced from the power supply. This is because, when determining that the present battery level is equal to or is greater than the set level, there is no case where the telephone conversation is ended because the battery power becomes insufficient during the telephone conversation in the electronic device.

In operation 708, the electronic device may determine whether the battery level is less than the set level. This is because, as the telephone conversation goes on, the battery level may be reduced to less than the set level, although the electronic device has determined that the initial battery level is equal to or is greater than the set level.

In operation 708, if the battery level is less than the set level in the aforementioned judgment process, then in operation 704, the electronic device may repeat the process of changing the path of the electric current introduced from the power supply, from the $1^{st}$ path to the $2^{nd}$ path. On the other hand, if the battery level is equal to or is greater than the set level, in operation 705, the electronic device may repeat the process of determining whether the specific event has ended.

Figure 8:
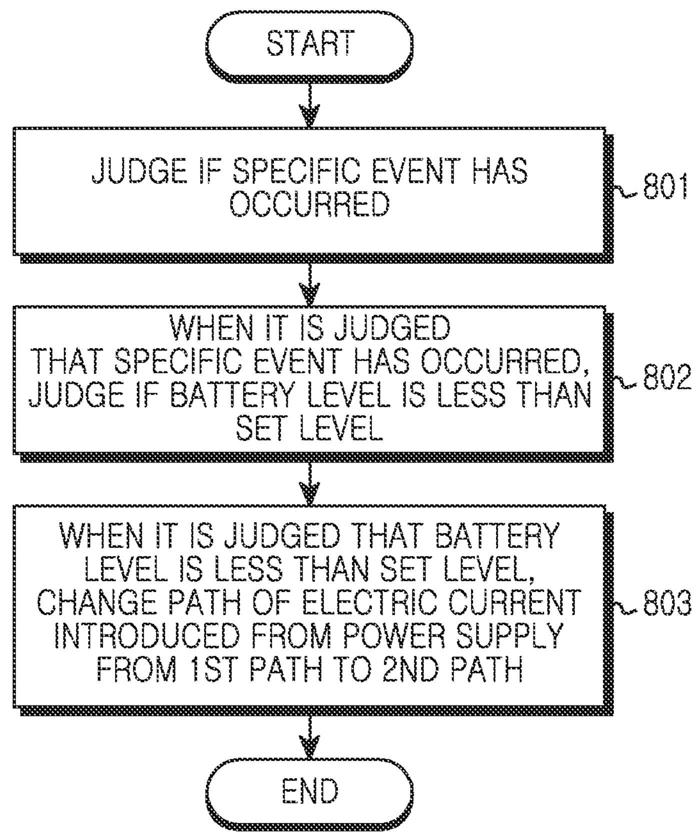
FIG. 8 is a flowchart illustrating a method of operating an electronic device according to an embodiment of the present disclosure.

FIG. 8 is a flowchart illustrating a method of an electronic device according to an embodiment of the present disclosure.

Referring to FIG. 8, in operation 801, the electronic device may determine whether a specific event has occurred. A central processing device provided in the electronic device may determine whether the specific event has occurred. The specific event may be an event of determining that a telephone conversation with another electronic device is begun. The specific event may be an event of determining that the electronic device receives a call request from another electronic device or sends a call request to another electronic device, thereby beginning the telephone conversation with another electronic device.

In operation 802, if the electronic device determines that the specific event has occurred, the electronic device may determine whether a battery level is less than a set level. A central processing device provided in the electronic device may determine whether a present battery level is equal to or is greater than the set level or is less than the set level.

In operation 803, if the electronic device determines that the present battery level is less than the set level, the electronic device may change a path of an electric current introduced from the power supply, from a set $1^{st}$ path to a set $2^{nd}$ path. If the central processing device determines that the present battery level is less than the set level, the central processing device may transmit to the control unit cutting off signal for cutting off an electric current applied toward the battery. The control unit may then control the transistor playing a switching role to cut off the electric current applied toward the battery. The control unit may control the transistor to open a conducting wire between the control unit and the battery. The control unit may control the transistor to open the shorted conducting wire between the control unit and the battery. The electronic device may determine that the electric current introduced from the power supply is not applied toward the battery.

It will be appreciated that embodiments of the present disclosure according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:

detecting that the electronic device is electronically connected to an external power supply;

detecting an event related to a call while a battery is charged based on a current introduced from the power supply;

determining a battery level in response to the detection of the event; and selecting an electrical path to flow the current according to the determined battery level, wherein, if the battery level is equal to or greater than a set level, a first electrical path to provide the battery with the current is selected, and wherein, if the battery level is less than the set level, a second electrical path to provide the processor with the current is selected.

2. The method of claim 1, wherein the event is an event of determining that a telephone conversation with another electronic device is begun.

3. The method of claim 1, wherein the current is provided to the battery through a charger integrated circuit (IC) in the first electrical path.

4. The method of claim 1, wherein the current is provided to the processor through the charger IC without passing through the battery in the second electrical path.

5. The method of claim 4, further comprising:

transmitting, by the processor, a signal to the charger IC if the battery level is less than the set level, the signal for cutting off the current toward the battery; and receiving, by the charging IC, the signal from the processor, wherein the charger IC is configured to control a transistor to disconnect a path between the charger IC and the battery based on the received signal.

6. The method of claim 1, further comprising:

determining whether the event has ended; and in response to the determination that the event has ended, selecting the first electrical path.

7. The method of claim 1, wherein the external power supply includes an external charger configured to charge the electronic device.

8. An electronic device comprising:

a battery; and a processor configured to:

detect that the electronic device is electronically connected to an external power supply, detect an event related to a call while the battery is charged based on a current introduced from the power supply, determine a battery level in response to the detection of the event, and select an electrical path to flow the current according to the determined battery level, wherein, if the battery level is equal to or greater than a set level, a first electrical path to provide the battery with the current is selected, and wherein, if the battery level is less than the set level, a second electrical path to provide the processor with the current is selected.

9. The electronic device of claim 8, wherein the event is an event of determining that a telephone conversation with another electronic device is begun.

10. The electronic device of claim 8, wherein the current is provided to the battery through a charger IC in the first electrical path.

11. The electronic device of claim 8, wherein the current is provided to the processor through the charger IC without passing through the battery in the second electrical path.

12. The electronic device of claim 11, wherein the processor is further configured to transmit a signal to the charger IC if the battery level is less than the set level, the signal for cutting off the current toward the battery, and wherein the charger IC is configured to:

receive the signal from the processor, and control a transistor to disconnect a path between the charger IC and the battery based on the received signal.

13. The electronic device of claim 12, wherein the external power supply includes an external charger configured to charge the electronic device.

14. The electronic device of claim 8, wherein the processor is further configured to:

determine whether the event has ended, and in response to the determination that the event has ended, select the first electrical path.

* * * * *